(12) United States Patent
Hasegawa

(10) Patent No.: US 6,881,481 B2
(45) Date of Patent: Apr. 19, 2005

(54) COMPOSITE FINE PARTICLES AND METHOD FOR PRODUCING THE SAME

(75) Inventor: Kazuhiro Hasegawa, Kanagawa (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 77 days.

(21) Appl. No.: 10/232,745

(22) Filed: Sep. 3, 2002

(65) Prior Publication Data

US 2003/0068380 A1 Apr. 10, 2003

(30) Foreign Application Priority Data

Aug. 31, 2001 (JP) ........................................ 2001-264479

(51) Int. Cl.[7] ................................................. B32B 5/16
(52) U.S. Cl. ........................ 428/402; 428/403; 428/404
(58) Field of Search ................................ 428/402, 403, 428/404

(56) References Cited

U.S. PATENT DOCUMENTS 6,268,014 B1 * 7/2001 Eberspacher et al. ......... 427/74

OTHER PUBLICATIONS

Hines, Margaret A., et al., "Synthesis and Characterization of Strongly Luminescing ZnS–Capped CdSe Nanocrystals," J. Phys. Chem., American Chemical Society, 1996, 100, pp. 468–471. Abstract published in Advance ACS Abstracts, Dec. 15, 1995.

Kortan, A.R., et al., "Nucleation and Growth of CdSe On ZnS Quantum Crystallite Seeds, and Vice Versa, In Inverse Micelle Media." J. Am. Chem. Soc., American Chemical Society, 1990, 112, pp. 1327–1332.

Malik, M. Azad, et al., "A Simple Route to the Synthesis of Core/Shell Nanoparticles of Chalcogenides." Chem. Mater., American Chemical Society, 2002, 14, pp. 2004–2010.

Cao, Lixin, et al., "Luminescence enhancement of core–shell ZnS:Mn/ZnS nanoparticles." Applied Physics Letters, American Institute of Physics, vol. 80, No. 23, Jun. 10, 2002, pp. 4300–4302.

* cited by examiner

Primary Examiner—Leszek B Kiliman
(74) Attorney, Agent, or Firm—Burns, Doane, Swecker & Mathis, L.L.P.

(57) ABSTRACT

A method for producing composite fine particles, which comprises one or more growth steps of growing, on surfaces of fine particles of a first Group II–VI compound, layers of a second Group II–VI compound having a bandgap different from that of the first Group II–VI compound and/or having an impurity or impurity concentration different from that of the first Group II–VI compound. This method enables production of composite fine particles of Group II–IV compounds having favorable performances in a simple manner.

28 Claims, 1 Drawing Sheet

(a)

(b)

(c)

(d)

COMPOSITE FINE PARTICLES AND METHOD FOR PRODUCING THE SAME

TECHNICAL FIELD

The present invention relates to novel composite fine particles consisting of Group II–VI compounds and a novel method for producing the same.

RELATED ART

Remarkable progress has been made in the semiconductor industry to such an extent that almost no equipments or systems can exist without semiconductors at present. While silicon is the mainstream of today's semiconductors, compound semiconductors have been noted in recent years due to the needs of higher processing speed and so forth. In the field of optoelectronics, for example, compound semiconductors play a leading role, and most of studies about light-emitting devices, photoelectric conversion elements, various lasers, nonlinear optical devices and so forth concern compound semiconductors. For example, Group II–VI compounds, which consist of a combination of Group II element such as Zn and Cd and a Group VI element such as O and S, are known to have an excellent luminescence (fluorescence) property, and applications thereof to various fields are expected. In the present specification, the phrase "Group II–VI compounds" refers to a compound consisting essentially of at least one Group II element and at least one Group VI element.

Meanwhile, these materials are generally used as particles having a uniform grain size in order to more effectively obtain their performances. Moreover, in recent years, the need for material development based on nanotechnology has been strongly recognized, and even finer sizes of particles of the aforementioned materials are also desired. The term "nanotechnology" used herein means techniques of manipulating and regulating atoms and molecules in the micro world in a scale of one millionth millimeter to utilize substance characteristics (e.g., quantum effect) unique to nanosize substances and thereby obtain their novel functions and excellent performances. The nanotechnology is not only important as a research field in itself, but also important in applied research fields such as light-emitting devices, photoelectric conversion elements, various lasers and nonlinear optical devices. It is considered that a major part of conventional production and processing techniques will shift to nanotechnology techniques within the 21st century. Under such circumstances, there are a large number of references concerning synthesis methods of nanosize semiconductor particles and examples of their applications. For example, Japanese Patent Laid-open Publication (Kokai) No. 2000-104058 reported that use of a nanosize particle fluorescent substance prepared by the coprecipitation method markedly increased light-emitting efficiency. Further, J. Am. Chem. Soc., 1993, 115, 8706–15 describes that a dispersion of nanometer size CdSe particles could be prepared in a liquid phase and the absorption spectrum was changed by the quantum size effect.

SUMMARY OF THE INVENTION

An object of the present invention is to provide a novel method that enables production of composite fine particles of Group II–IV compounds having favorable performances in a simple manner. Further, another object of the present invention is to provide a method that enables production of composite fine particles of Group II–IV compounds having a narrow particle size distribution. A further object of the present invention is to provide novel composite fine particles of Group II–IV compounds having favorable performances.

In order to achieve the aforementioned objects, the method for producing composite fine particles of the present invention comprises one or more growth steps of growing, on surfaces of fine particles of a first Group II–VI compound, layers of a Group II–VI compound having a bandgap different from that of the first Group II–VI compound.

Further, in order to achieve the aforementioned objects, the method for producing composite fine particles of the present invention as another aspect comprises one or more growth steps of growing, on surfaces of fine particles of a first Group II–VI compound, layers of a second Group II–VI compound, wherein
(1) the second Group II–VI compound has a bandgap different from that of the first Group II–VI compound, and/or,
(2) the second Group II–VI compound contains an impurity different from that of the first Group II–VI compound and/or the second Group II–VI compound has an impurity concentration different from that of the first Group II–VI compound.

As embodiments of the present invention, there are provided aforementioned methods for producing composite fine particles, which comprises a production step of producing the fine particles of the first Group II–VI compound in a liquid phase.

As preferred embodiments of the present invention, there are provided the aforementioned methods for producing composite fine particles, wherein the growth step or steps are performed in a liquid phase; and as more preferred embodiments, there are provided the aforementioned methods for producing composite fine particles, wherein the liquid phase contains a surfactant; the aforementioned methods for producing composite fine particles, wherein the liquid phase is irradiated with ultrasonic waves in the growth step or steps; and the aforementioned methods for producing composite fine particles, wherein the liquid phase contains an organic acid compound in the growth step or steps.

Further, in order to achieve the aforementioned objects, the composite fine particles of the present invention comprise fine particles of a first Group II–VI compound and layers covering at least parts of surfaces of the fine particles and composed of a second Group II–VI compound, wherein
(1) the second Group II–VI compound has a bandgap different from that of the first Group II–VI compound, and/or,
(2) the second Group II–VI compound contains an impurity different from that of the first Group II–VI compound and/or the second Group II–VI compound has an impurity concentration different from that of the first Group II–VI compound. The present invention particularly includes the composite fine particles comprising plural fine particles of a first Group II–VI compound and layers of a second Group II–VI compound covering parts or all of surfaces of the fine particles wherein either (1) or (2) above is satisfied.

In the composite fine particles of the present invention, since at least parts of surfaces of the fine particles composed of the Group II–VI compound are covered with the Group II–VI compound having a bandgap different from that of the Group II–VI compound of the fine particles and/or the Group II–VI compound having an impurity concentration different from that of the Group II–VI compound of the fine particles, improvement of the quantum confinement effect and reduction of crystal surface defects can be expected. As a result, reduction of nonradiative transition and improvement of various performances (e.g., light-emitting performance) can be expected.

In the present specification, the concept of "covering" also encompasses a state of only having contact. Further, the term "layer" also encompasses a mass of particles having various shapes smaller than, equivalent to or larger than the covered fine particles and so forth. The "layer" may cover two or more fine particles.

BEST MODE FOR CARRYING OUT THE INVENTION

Figure 1:
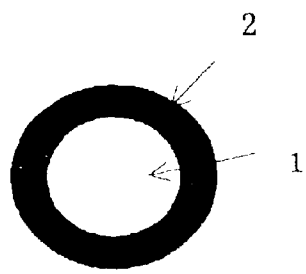
FIG. 1 includes schematic views showing examples of shapes of composite fine particles of the present invention.
Figure 1:
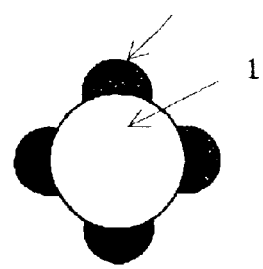
Figure 1:
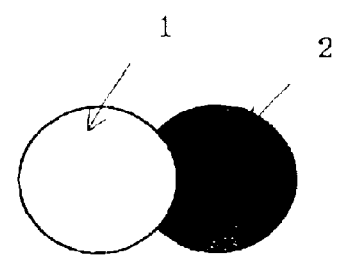
Figure 1:
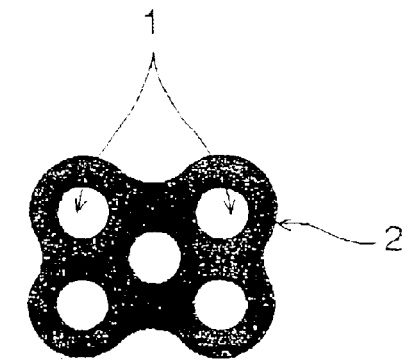

Hereafter, the present invention will be explained in detail.

As one embodiment of the present invention, there can be mentioned a method for producing composite fine particles, which comprises a first step of producing fine particles of a first Group II–VI compound and a second step of growing layers of at least one second Group II–VI compound having a bandgap different from that of the first Group II–VI compound on surfaces of the aforementioned fine particles.

The method for producing the fine particles in the first step is not particularly limited, and a precipitation method in which particles are produced in a liquid phase, a vapor-phase synthesis method using an organic material and an inorganic material as starting materials, a spray pyrolysis method in which particles are directly produced from a solution and so forth can be utilized. Above all, the precipitation method in which particles are produced in a liquid phase is preferred in view of the efficiency in production of fine particles of a Group II–VI compound. Examples of the precipitation method in which particles are produced in a liquid phase include, for example, a method of adding a solution containing Group VI element to a solution containing at least one Group II metal ion or the other way round, a method of simultaneously adding a solution containing at least one Group II metal ion and a solution containing Group VI element to a reaction system, a method of introducing a gas containing Group VI element to a solution containing at least one Group II metal ion, a method of adding a substance that releases a substance containing Group VI element by hydrolysis to a solution containing at least one Group II metal ion and heating the mixture and so forth. When the fine particles are precipitated in a liquid phase, it is preferable to stir the liquid phase. Further, the liquid phase may be heated as desired.

As a specific embodiment of the aforementioned first step, there can be mentioned a step of continuously adding a solution containing Group VI element (for example, a solution of sodium sulfide, ammonium sulfide or the like) to a heated and stirred solution containing a salt of at least one Group II element (for example, zinc acetate, zinc nitrate, zinc chloride, cadmium acetate, cadmium nitrate, cadmium chloride or the like) to obtain fine particles of the Group II–VI compound as precipitates.

The fine particles of the Group II–VI compound produced in the liquid phase in the first step can be isolated from the liquid phase, subjected to washing or the like as desired, and then used for the second step. Further, the Group II–VI compound produced in the liquid phase in the first step can also be used for the second step as it is without being isolated from the liquid phase. Excess cations or anions in the liquid phase can usually be removed by precipitating fine particles by centrifugation or the like to separate them from the liquid phase. Further, they can also be removed by a known ion exchange method using an ion-exchange resin or an ultrafiltration membrane.

In the second step, layers of a Group II–VI compound at least having a bandgap different from that of the Group II–VI compound of the fine particles obtained in the first step are grown on surfaces of the fine particles of the Group II–VI compound to produce composite fine particles. The bandgap of Group II–VI compound varies depending on the element composition. Further, even a Group II–VI compound having substantially the same element composition may have a different bandgap when it contains a different impurity and/or a different concentration of impurity or the like. Therefore, in the second step, a Group II–VI compound having a bandgap different from that of the Group II–VI compound used in the first step can be grown by using elements different from the elements of Group II and/or Group VI used in the first step. Further, layers of a Group II–VI compound having a bandgap different from that of the Group II–VI compound used in the first step can also be grown by changing impurity element added to a reaction system and/or concentration of the impurity element added to the reaction system in the second step. Further, two or more of these methods may be combined to change the bandgap.

As the case of the first step, the method for producing the layers in the second step is not particularly limited, and a precipitation method in which particles are produced in a liquid phase, a vapor-phase synthesis method using an organic material and an inorganic material as starting materials, a spray pyrolysis method in which particles are directly produced from a solution and so forth can be utilized. Above all, the precipitation method in which particles are produced in a liquid phase is preferred in view of growth efficiency of the Group II–VI compound. As the method for precipitating fine particles in a liquid phase, the various methods mentioned for the first step can also be utilized.

Specific examples (1) to (5) of the second step will be mentioned below. However, the second step is not limited to these examples.

(1) A dispersion obtained by dispersing the fine particles obtained in the first step in a solution of at least one salt of Group II element (for example, zinc acetate, zinc nitrate, zinc chloride, cadmium acetate, cadmium nitrate, cadmium chloride or the like, the same in the following specific examples) is continuously added with a solution containing Group VI element (for example, a solution of sodium sulfide, ammonium sulfide or the like, the same in the following specific examples) with heating and stirring to obtain composite fine particles, as precipitates, in which layers of the Group II–VI compound are grown on surfaces of the aforementioned fine particles.

(2) A dispersion obtained by dispersing the fine particles obtained in the first step in a solution containing at least one salt of Group II element and a surfactant is continuously added with a solution containing Group VI element with heating and stirring to obtain composite fine particles, as precipitates, in which layers of the Group II–VI compound are grown on surfaces of the aforementioned fine particles. In this example, adsorption of the surfactant to the surfaces of the fine particles activates the surfaces of the fine particles, and thus covering with the Group II–VI compound is promoted. As the surfactant, hexadecyltrimethylammonium bromide, sodium dodecylbenzenesulfonate or the like is preferred. The amount of the surfactant added is preferably 0.1–30 times (more preferably 0.3–10 times) of the mass of the fine particles in the dispersion in view of formation of the composite fine particles and improvement of performances (for example, improvement of photoluminescence intensity).

(3) A dispersion obtained by dispersing the fine particles obtained in the first step in a solution containing at least one salt of Group II element is continuously added with a solution containing Group VI element with heating, stirring and ultrasonic irradiation to obtain composite fine particles, as precipitates, in which layers of the Group II–VI compound are grown on surfaces of the aforementioned fine particles. In this example, the ultrasonic irradiation of the liquid phase prevents production of new nuclei in the second step due to activation of the surfaces of the fine particles, and hence productivity is improved.

(4) A dispersion obtained by dispersing the fine particles obtained in the first step is stoichiometrically continuously added with a solution containing at least one salt of Group II element and a solution containing Group VI element by using separate pumps to obtain composite fine particles, as precipitates, in which layers of the Group II–VI compound are grown on surfaces of the aforementioned fine particles. In this example, the growth of the layers of the Group II–VI compound in the second step can be precisely controlled.

(5) A dispersion obtained by dispersing the fine particles obtained in the first step in a solution containing at least one salt of Group II element and a compound that releases a substance containing Group VI element by hydrolysis (for example, thioacetamide or the like) is heated with stirring to obtain composite fine particles in which layers of the Group II–VI compound are grown on surfaces of the aforementioned fine particle as precipitates.

By repeating the aforementioned second step twice or more, composite fine particles including 3 or more regions composed of Group II–VI compounds having bandgaps different from one another can be produced.

The composite fine particles produced in the second step are separated from the liquid phase, optionally subjected to washing or the like if desired and then used for various purposes. Excess cations or anions attached to the composite fine particles can be removed usually by dispersing the composite fine particles in water or the like and then precipitating the composite fine particles by centrifugation or the like to separate them from the liquid phase. Further, these excess ions can also be removed by using a known ion exchange method using an ion-exchange resin or an ultrafiltration membrane.

As the liquid phases used in the first and second steps, either a hydrophilic solvent or a hydrophobic solvent may be used. Any solvent can be used so long as a raw material compound (for example, a salt of Group II element) can be dissolved (or dispersed) therein. One or more solvents may be used in combination. However, when two or more solvents are used, two or more solvents including both a hydrophilic solvent and a hydrophobic solvent are preferably used in combination considering solubility and reactivity of the raw materials. Further, all the raw materials do not need to be dissolved, and the liquid phase may be a suspension in which a part of or the whole raw materials are dispersed or the like instead of a uniform solution.

In the first step, by adding an impurity (for example, an element such as manganese, copper, silver or rare earth metal) to the liquid phase (for example, adding the impurity in a state of ions), fine particles doped with the impurity can be readily produced. Further, in the second step, by adding an impurity to the liquid phase, layers of Group II–VI compound doped with the impurity element can be easily grown.

In the first step and/or the second step, an organic acid compound can be added to the liquid phase. Preferred examples of the organic acid compound include acrylic acid, methacrylic acid and so forth. These organic acid compounds may be added at any time of before, during and after production of particles. Further, particles added with an organic acid compound can be irradiated with an ultraviolet ray having a wavelength of 400 nm or shorter.

In the present invention, by controlling conditions for producing fine particles of Group II–VI compound (for example, stirring speed of the liquid phase, addition rates of reagents to the reaction system, concentrations of reagents in the liquid phase, selection of solvent etc.), composite fine particles having a uniform grain size of 1 nm to 1 µm can be readily produced. That is, composite fine particles having a minimum grain size of nano order to micro order can be efficiently produced.

The composite fine particles produced by the method of the present invention are characterized by including fine particles of the first Group II–VI compound and the second Group II–VI compound that covers at least parts of surfaces of the fine particles and has a bandgap different from that of the first Group II–VI compound. These first and second Group II–VI compounds are composed of different Group II elements and/or Group VI elements. Alternatively, the first and second Group II–VI compounds have substantially the same element composition, but have different impurity elements and/or different concentrations of impurity elements.

As the first and/or second Group II–VI compounds, compounds consisting of at least one Group IIB element and at least one Group VIB element are preferably used. There can be mentioned at least one compound among zinc sulfide, cadmium sulfide, zinc selenide, cadmium selenide, zinc oxide and so forth. The bandgap of the second Group II–VI compound is preferably larger than that of the first Group II–VI compound. Further, as the impurity element that can be doped into the first and/or second Group II–VI compounds, there can be mentioned at least one element among manganese, copper, silver, rare earth metals and so forth.

Schematic views of the shapes of composite fine particles that can be produced by the methods of the present invention are shown in FIGS. 1(a) to (c). FIG. 1(a) schematically shows a shape of particle having a double structure in which surface of a fine particle 1 of the first Group II–VI compound is completely covered with the second Group II–VI compound. FIG. 1(b) schematically shows a shape in which extremely fine particles of the second Group II–VI compound attach to the surface of the fine particle 1 of the first Group II–VI compound. FIG. 1(c) schematically shows a shape in which a fine particle 1 of the first Group II–VI compound and fine particle of the second Group II–VI compound having equivalent sizes are bonded to each other. FIG. 1(d) schematically shows an aggregated shape in which plural fine particles 1 of the first Group II–VI compound are covered with the second Group II–VI compound. However, the shapes of the composite fine particles of the present invention of course are not limited to these examples so long as composite fine particles are formed by Group II–VI compounds having bandgaps different from each other or Group II–VI compounds having impurity concentrations different from each other that are in contact with each other.

EXAMPLES

The present invention will be more specifically explained with reference to the following examples. Materials, reagents, proportions, procedures and so forth mentioned in the following examples can be appropriately changed unless such changes depart from the spirit of the present invention. Accordingly, the scope of the present invention is not limited to these specific examples.

Example 1

A solution of cadmium acetate (2.67 g) dissolved in methanol (100 mL) was placed and stirred in a 200-mL beaker. The solution being stirred was added with 50 mL of a solution obtained by dissolving sodium sulfide nonahydrate (2.4 g) in a mixed solvent of water and methanol (volume ratio=1:1) at an addition rate of 10 mL/min by using a cylinder pump to obtain precipitates of fine particles of cadmium sulfide. The mixture was centrifuged at 8000 rpm for 15 minutes to separate the precipitates from the solution, and then the precipitates were dispersed again in water (150 mL) for washing. By repeating the operations of separation and washing, byproducts were removed from the cadmium sulfide.

The obtained fine particles of cadmium sulfide were dispersed again in methanol (100 mL) added with acrylic acid (3.6 g), then placed and stirred in a 200-mL beaker. The suspension being stirred was stoichiometrically simultaneously added with 50 mL of a solution obtained by dissolving zinc acetate dihydrate (2.2 g) in methanol and 50 mL of a solution obtained by dissolving sodium sulfide nonahydrate (2.4 g) in a mixed solvent of water and methanol (volume ratio: 1:1) at an addition rate of 0.1 mL/min by using separate cylinder pumps to grow layers of zinc sulfide on surfaces of the aforementioned fine particles of cadmium sulfide. The mixture was centrifuged at 8000 rpm for 15 minutes to separate precipitates from the solution, and then the precipitates were dispersed again in water (150 mL) for washing. After byproducts were removed by repeating the operations of separation and washing, the particles were dried at 50° C. to obtain composite fine particles in which the zinc sulfide layers were in contact with the fine particles of cadmium sulfide.

Example 2

Composite fine particles in which zinc sulfide layers were in contact with fine particles of cadmium sulfide were obtained in the same manner as in Example 1 except that the suspension was added with hexadecyltrimethylammonium bromide (3.6 g) as a surfactant.

Example 3

Composite fine particles in which zinc sulfide layers were in contact with fine particle of cadmium sulfide were obtained in the same manner as in Example 2 except that the suspension was added with a solution of zinc acetate and a solution of sodium sulfide separately while being irradiated with ultrasonic waves at 20 kHz–300 W/cm$^2$ by using a horn-type ultrasonic irradiation apparatus.

Example 4

A solution of cadmium acetate (2.67 g) dissolved in methanol (100 mL) was placed and stirred in a 200-mL beaker. The solution being stirred was added with 50 mL of a solution obtained by dissolving sodium sulfide nonahydrate (2.4 g) in a mixed solvent of water and methanol (volume ratio=1:1) at an addition rate of 10 mL/min by using a cylinder pump to obtain precipitates of fine particles of cadmium sulfide. The mixture was centrifuged at 8000 rpm for 15 minutes to separate the precipitates from the solution, and then the precipitates were dispersed again in water (150 mL) for washing. By repeating the operations of separation and washing, byproducts were removed from the cadmium sulfide.

The obtained fine particles of cadmium sulfide were dispersed again in water (100 mL) dissolving zinc acetate dehydrate (2.2 g), thioacetamide (3 g) and acrylic acid (3.6 g), then placed and stirred in a 200-mL beaker. The suspension being stirred was heated from room temperature at a temperature rise rate of 1° C./min and maintained at 70° C. for 4 hours to allow growth of zinc sulfide layers on surfaces of the aforementioned fine particles of cadmium sulfide. The mixture was centrifuged at 8000 rpm for 15 minutes to separate precipitates from the solution, and then the precipitates were dispersed again in water (150 mL) for washing. After byproducts were removed by repeating the operations of separation and washing, the particles were dried at 50° C. to obtain composite fine particles in which zinc sulfide layers were in contact with the surfaces of the fine particles of cadmium sulfide.

Example 5

A solution of zinc acetate dihydrate (2.2 g) and manganese acetate (0.08 g) dissolved in methanol (100 mL) was placed and stirred in a 200-mL beaker. The solution being stirred was added with 50 mL of a solution obtained by dissolving sodium sulfide nonahydrate (2.47 g) in a mixed solvent of water and methanol (volume ratio=1:1) at an addition rate of 10 mL/min by using a cylinder pump to obtain fine particles of manganese-doped zinc sulfide as precipitates. The mixture was centrifuged at 8000 rpm for 15 minutes to separate the precipitates from the solution, and then the precipitates were dispersed again in water (150 mL) for washing. By repeating the operations of separation and washing, byproducts were removed from the manganese-doped zinc sulfide.

The obtained fine particles of manganese-doped zinc sulfide were dispersed again in methanol (100 mL) added with acrylic acid (3.6 g), then placed and stirred in a 200-mL beaker. The suspension being stirred was stoichiometrically simultaneously added with 50 mL of a solution obtained by dissolving zinc acetate dihydrate (2.2 g) in methanol and 50 mL of a solution obtained by dissolving sodium sulfide nonahydrate (2.4 g) in a mixed solvent of water and methanol (volume ratio: 1:1) at an addition rate of 0.1 mL/min by using separate cylinder pumps to allow growth of zinc sulfide layers on surfaces of the aforementioned fine particles of manganese-doped zinc sulfide. The mixture was centrifuged at 8000 rpm for 15 minutes to separate precipitates from the solution, and then the precipitates were dispersed again in water (150 mL) for washing. After byproducts were removed by repeating the operations of separation and washing, the particles were dried at 50° C. to obtain composite fine particles in which zinc sulfide layers not doped with manganese were in contact with surfaces of the fine particles of manganese-doped zinc sulfide.

Example 6

Composite fine particles in which layers of zinc sulfide not doped with manganese were in contact with surfaces of fine particles of manganese-doped zinc sulfide were obtained in the same manner as in Example 5 except that the suspension was added with hexadecyltrimethylammonium bromide (3.6 g) as a surfactant.

Example 7

Composite fine particles in which layers of zinc sulfide not doped with manganese were in contact with surfaces of fine particles of manganese-doped zinc sulfide were obtained in the same manner as in Example 6 except that the suspension was separately added with a solution of zinc acetate and a solution of sodium sulfide while being irradiated with ultrasonic waves at 20 kHz–300 W/cm$^2$ by using a horn-type ultrasonic irradiation apparatus.

Example 8

A solution of zinc acetate dihydrate (2.2 g) and manganese acetate (0.08 g) dissolved in methanol (100 mL) was placed and stirred in a 200-mL beaker. The solution being stirred was added with 50 mL of a solution obtained by dissolving sodium sulfide nonahydrate (2.47 g) in a mixed solvent of water and methanol (volume ratio=1:1) at an addition rate of 10 mL/min by using a cylinder pump to obtain fine particles of manganese-doped zinc sulfide as precipitates. The mixture was centrifuged at 8000 rpm for 15 minutes to separate the precipitates from the solution, and then the precipitates were dispersed again in water (150 mL) for washing. By repeating the operations of separation and washing, byproducts were removed from the manganese-doped zinc sulfide.

The obtained fine particles of manganese-doped zinc sulfide were dispersed again in water (100 mL) dissolving zinc acetate dihydrate (2.2 g), thioacetamide (3 g) and acrylic acid (3.6 g), then placed and stirred in a 200-mL beaker. The suspension being stirred was heated from room temperature at a temperature rise rate of 1° C./min and maintained at 70° C. for 4 hours to allow growth of zinc sulfide layers on surfaces of the aforementioned fine particles of manganese-doped zinc sulfide. The mixture was centrifuged at 8000 rpm for 15 minutes to separate precipitates from the solution, and then the precipitates were dispersed again in water (150 mL) for washing. After byproducts were removed by repeating the operations of separation and washing, the particles were dried at 50° C. to obtain composite fine particles in which layers of zinc sulfide not doped with manganese were in contact with the surfaces of the fine particles of manganese-doped zinc sulfide.

Comparative Example 1

A solution of cadmium acetate (2.67 g) and acrylic acid (3.6 g) dissolved in methanol (100 mL) was placed and stirred in a 200-mL beaker. The solution being stirred was added with 50 mL of a solution obtained by dissolving sodium sulfide nonahydrate (2.4 g) in a mixed solvent of water and methanol (volume ratio=1:1) at an addition rate of 10 mL/min by using a cylinder pump to obtain fine particles of cadmium sulfide as precipitates. The mixture was centrifuged at 8000 rpm for 15 minutes to separate the precipitates from the solution, and then the precipitates were dispersed again in water (150 mL) for washing. After byproducts were removed by repeating the operations of separation and washing, the particles were dried at 50° C. to obtain fine particles of cadmium sulfide.

Comparative Example 2

A solution of zinc acetate dihydrate (2.2 g), manganese acetate dihydrate (0.08 g) and acrylic acid (3.6 g) dissolved in methanol (100 mL) was placed and stirred in a 200-mL beaker. The solution being stirred was added with 50 mL of a solution obtained by dissolving sodium sulfide nonahydrate (2.47 g) in a mixed solvent of water and methanol (volume ratio=1:1) at an addition rate of 10 mL/min by using a cylinder pump to obtain fine particles of manganese-doped zinc sulfide as precipitates. The mixture was centrifuged at 8000 rpm for 15 minutes to separate the precipitates from the solution, and then the precipitates were dispersed again in water (150 mL) for washing. After byproducts were removed by repeating the operations of separation and washing, the particles were dried at 50° C. to obtain fine particles of manganese-doped zinc sulfide.

Photoluminescence was measured for the samples produced in the examples and comparative examples by using a fluorescence spectrophotometer. The results are shown in Table 1.

TABLE 1

| | Photoluminescence intensity |
|---|---|
| Comparative Example 1 | 100 |
| Example 1 | 300 [1] |
| Example 2 | 310 [1] |
| Example 3 | 350 [1] |
| Example 4 | 280 [1] |
| Comparative Example 2 | 100 |
| Example 5 | 180 [2] |
| Example 6 | 190 [2] |
| Example 7 | 210 [2] |
| Example 8 | 150 [2] |

[1] Value relative to the value of Comparative Example 1 taken as 100
[2] Value relative to the value of Comparative Example 2 taken as 100

The results shown in Table 1 reveal that the composite fine particles of the examples showed stronger photoluminescence intensity compared with the fine particles of the comparative examples. These effects are considered to be attributable to a higher quantum confinement effect brought by covering or contact with a Group II–VI compound having a different bandgap or a Group II–VI compound having a different impurity concentration, or reduced nonradiative transition brought by less crystal surface defects in the active phase.

According to the present invention, there can be provided a novel method that enables production of composite fine particles of Group II–IV compounds having favorable performances in a simple manner. According to the present invention, there can also be provided a method that enables production of composite fine particles of Group II–IV compounds having a narrow particle size distribution. According to the present invention, there can further be provided novel composite fine particles of Group II–IV compounds having favorable performances.

What is claimed is:

1. A composite fine particle comprising a fine particle of a first Group II–VI compound and a layer covering at least a part of a surface of the fine particle and composed of a second Group II–VI compound, wherein
the second Group II–VI compound contains an impurity different from that of the first Group II–VI compound and/or the second Group II–VI compound has an impurity concentration different from that of the first Group II–VI compound.

2. A method for producing the composite fine particle according to claim 1, which comprises one or more growth steps of growing the layer of the second Group II–VI compound on the surface of the fine particle of the first Group II–VI compound.

3. The method for producing the composite fine particle according to claim 2, which comprises one or more growth steps of growing, on the surface of the fine particle of the first Group II–VI compound, the layer of the second Group II–VI compound having a larger bandgap than that of the first Group II–VI compound.

4. The method for producing the composite fine particle according to claim 2, which comprises one or more growth steps of growing, on the surface of the fine particle of the first Group II–VI compound containing an impurity, the layer of the second Group II–VI compound free from impurities.

5. The method for producing the composite fine particle according to claim 2, which comprises a production step of producing the fine particle of the first Group II–VI compound in a liquid phase.

6. The method for producing the composite fine particle according to claim 2, wherein the growth step or steps are performed in a liquid phase.

7. The method for producing the composite fine particle according to claim 6, wherein, in the growth step or steps, the liquid phase contains a surfactant.

8. The method for producing the composite fine particle according to claim 7, wherein said surfactant is hexadecyltrimethylammonium bromide or sodium dodecylbenzenesulfonate.

9. The method for producing the composite fine particle according to claim 2, wherein said first Group II–VI compound and/or said second Group II–VI compound is selected from zinc sulfide, cadmium sulfide, zinc selenide, cadmium selenide and zinc oxide.

10. The method for producing the composite fine particle according to claim 2, wherein said impurity is an element selected from manganese, copper, silver and rare earth metal.

11. The method for producing the composite fine particle according to claim 6, wherein, in the growth step or steps, the liquid phase is irradiated with ultrasonic waves.

12. The method for producing the composite fine particle according to claim 5, wherein in the production step, the liquid phase contains an organic acid compound.

13. The method for producing the composite fine particle according to claim 12, wherein said organic acid compound is acrylic acid or methacrylic acid.

14. The method for producing the composite fine particle according to claim 5, wherein said liquid phase contains an impurity.

15. The method for producing the composite fine particle according to claim 6, wherein the growth step or steps comprises dispersing the fine particle of the first Group II–VI compound in a solution of at least one salt of Group II element, and continuously adding a solution containing Group VI element to the dispersion with heating and stirring to obtain the composite fine particle, as a precipitate, in which the layer of the Group II–VI compound is grown on the surface of the fine particle of the first Group II–VI compound.

16. The method for producing the composite fine particle according to claim 6, wherein the growth step or steps comprises dispersing the fine particle of the first Group II–VI compound in a solution of at least one salt of Group II element and a surfactant, continuously adding a solution containing Group VI element to the dispersion with heating and stirring to obtain the composite fine particle, as a precipitate, in which the layer of the Group II–VI compound is grown on the surface of the fine particle of the first Group II–VI compound.

17. The method for producing the composite fine particle according to claim 6, wherein the growth step or steps comprises dispersing the fine particle of the first Group II–VI compound in a solution of at least one salt of Group II element, and continuously adding a solution containing Group VI element to the dispersion with heating, stirring and ultrasonic irradiation to obtain the composite fine particle, as a precipitate, in which the layer of the Group II–VI compound is grown on the surface of the fine particle of the first Group II–VI compound.

18. The method for producing the composite fine particle according to claim 6, wherein the growth step or steps comprises dispersing the fine particle of the first Group II–VI compound, and continuously adding to the dispersion a solution containing at least one salt of Group II element and a solution containing Group VI element stoichiometrically with separate pumps to obtain the composite fine particle, as a precipitate, in which the layer of the Group II–VI compound is grown on the surface of the fine particle of the first Group II–VI compound.

19. The method for producing the composite fine particle according to claim 6, wherein the growth step or steps comprises dispersing the fine particle of the first Group II–VI compound in a solution containing at least one salt of Group II element and a compound that releases a substance containing Group VI element by hydrolysis, and heating the dispersion with stirring to obtain the composite fine particle, as a precipitate, in which the layer of the Group II–VI compound is grown on the surface of the fine particle of the first Group II–VI compound.

20. A composite fine particle produced by the method according to claim 1.

21. The composite fine particle according to claim 1, wherein the first Group II–VI compound is a sulfide.

22. The composite fine particle according to claim 1, wherein the first Group II–VI compound is ZnS.

23. The composite fine particle according to claim 1, wherein the second group II–VI compound is a sulfide.

24. The composite fine particle according to claim 21, wherein the second Group II–VI compound is a sulfide.

25. The composite fine particle according to claim 22, wherein the second Group II–VI compound is a sulfide.

26. The composite fine particle according to claim 1, wherein the second Group II–VI compound is ZnS.

27. The composite fine particle according to claim 21, wherein the second Group II–VI compound is ZnS.

28. The composite fine particle according to claim 22, wherein the second Group II–VI compound is ZnS.

* * * * *